(12) United States Patent
Glebe

(10) Patent No.: US 8,639,590 B2
(45) Date of Patent: Jan. 28, 2014

(54) SYSTEMS, METHODS, AND ARTICLES OF MANUFACTURE FOR CHECKING AVAILABILITY OF PRODUCTS

(75) Inventor: Thorsten Glebe, Leimen (DE)

(73) Assignee: SAP AG, Walldorf (DE)

( * ) Notice: Subject to any disclaimer, the term of this patent is extended or adjusted under 35 U.S.C. 154(b) by 2319 days.

(21) Appl. No.: 11/025,017

(22) Filed: Dec. 30, 2004

(65) Prior Publication Data
US 2005/0289007 A1   Dec. 29, 2005

(30) Foreign Application Priority Data
Jun. 29, 2004   (EP) .................................... 04015212

(51) Int. Cl.
*G06Q 10/00* (2012.01)
(52) U.S. Cl.
USPC .............................................. 705/28; 705/26
(58) Field of Classification Search
USPC ..................................................... 705/28, 10
See application file for complete search history.

(56) References Cited

U.S. PATENT DOCUMENTS

| | | | |
|---|---|---|---|
| 5,953,707 A | 9/1999 | Huang et al. | |
| 6,766,334 B1 * | 7/2004 | Kaler et al. ............................. | 1/1 |
| 2002/0042756 A1 * | 4/2002 | Kumar et al. .................... | 705/26 |
| 2003/0006281 A1 * | 1/2003 | Thomas et al. ................ | 235/385 |
| 2003/0083947 A1 * | 5/2003 | Hoffman et al. ................. | 705/22 |
| 2003/0154144 A1 * | 8/2003 | Pokorny et al. .................. | 705/28 |
| 2003/0158795 A1 * | 8/2003 | Markham et al. ................ | 705/28 |
| 2004/0010454 A1 | 1/2004 | Helmolt et al. | |
| 2005/0028091 A1 * | 2/2005 | Bordawekar et al. .......... | 715/514 |

OTHER PUBLICATIONS

Bartsch et al, "Supply Chain Management mit SAP APO Supply-Chain-Modelle mit dem Advanced Planner & Optimizer 3.1", Galileo Press, XP002313804, 2002.
European Search Report and Communication, mailed Feb. 23, 2006 (3 pages).

* cited by examiner

*Primary Examiner* — Garcia Ade
(74) *Attorney, Agent, or Firm* — Finnegan, Henderson, Farabow, Garrett & Dunner, LLP

(57) ABSTRACT

A computer-implemented method of checking the availability of products comprising deriving information on one or more second electronic data sets based on information received on a plurality of first data sets. Each first data set includes a first key, including a primary key element and secondary keys elements representative of product-related conditions, and a product quantity related to a single point of time or time period. Each second data set includes a second key, formed exclusively of the secondary key elements, and product quantities related to a series of points of time or time periods. Information on the availability of one or more products is derived by checking the information on the second data sets against one or more product-related checking requirements. Furthermore, the information on the second data sets is directly generated (i.e., with no intermediary linear array) based on the information on the first data sets.

10 Claims, 4 Drawing Sheets

SYSTEMS, METHODS, AND ARTICLES OF MANUFACTURE FOR CHECKING AVAILABILITY OF PRODUCTS

RELATED APPLICATIONS

This application claims the benefit of European Patent Application No. 04015212.6, filed Jun. 29, 2004, the content of which is expressly hereby incorporated by reference in its entirety.

BACKGROUND

1. Technical Field

The present invention generally relates to the field of electronic product availability checks, and addresses computational performance issues in such availability checks.

2. Background Information

In modern industries, supply chain management has become an important tool in the planning and organization of business processes. ATP (Availability-to-Promise) checks, also known as availability checks, allow to ensure that a company can provide a requested product at a requested time in a requested quantity. The ATP check allows to determine if a requirement can be confirmed. Among ATP checks, there is known a product availability check, which carries out the availability check against what is referred to as the ATP quantity. In other words, the product availability check calculates the available amount of a product at a certain time. The ATP quantity is calculated from stock, planned receipts (production orders, purchase orders, planned orders and so on), and planned requirements (sales orders, deliveries, reservations and so on).

Product availability checks use ATP time series as input data. ATP time series represent incoming and outgoing movements (receipts and issues) for specific products. In an ATP time series, the receipt, requirements and stock elements are managed in aggregated (time-based) form. ATP time series are managed separately for each planning object and updated when changes are made to this planning object. Typically, aggregation occurs on a daily basis, but other periods of aggregation are conceivable, as well. ATP time series thus represent the current planning situation for the planning object for a series of points of time or time periods (buckets).

In a known solution implemented, e.g., in software packages SAP R/3 and SAP APO by SAP AG, Walldorf, and enabling a characteristics-based product availability check, the individual ATP time series includes a key consisting of category, sublocation, version and one or more valuated characteristics. This key uniquely identifies the particular ATP time series. Category refers to the particular type of stock, receipts and requirements that are to be considered in the product availability check. By choosing one or more categories, the user can define the scope of the availability check. Created production orders and released production orders are but two examples of categories. Sublocation and version correspond respectively to the storage location in a plant and the batch of the product. Characteristics may refer to features such as color, size, weight and length of the product. For more information on product availability checks and ATP time series, it is referred to Helmut Bartsch, Peter Bickenbach: "Supply Chain Management mit SAP APO—Supply-Chain-Modelle mit dem Advanced Planner & Optimizer 3.1", SAP Press, 2$^{nd}$ edition, 2002, ISBN No. 3-89842-111-2, the content of which is herewith expressly incorporated by reference.

In the following, procedures of the conventionally known product availability check are discussed in more detail by way of example with reference to FIG. 4. The product availability check is done on various levels such as plant level, sublocation level, version level, sublocation & version level, version & characteristics level, etc. The total result is the minimum of the results on the levels. For each level check, a separate ATP stack is filled based on the input ATP time series data. The input data is exploded with respect to sublocation, version and characteristics and stored in a linear structure with indexed access before it is filled into the stacks. The linear structure is herein referred to as exploded bucket array.

On the left-hand side of FIG. 4, three exemplary data sets 10, 12, 14 are depicted. Each of the data sets 10, 12, 14 represents an aggregated planning situation for a specific product with regard to a particular time bucket (e.g., day or shift) and order category. For example, the data set 10 indicates that in a category C1, which in the example considered may stand for a receipt order of a first type, an aggregated quantity q1 of the product having version V and characteristics CK will be received at a time t1 in a sublocation S. The data set 12 indicates that with regard to a category C2, which, e.g., may be a receipt order of another type, an aggregated quantity q2 of the product having version V and characteristics CK will be received in sublocation S at a time t2. Further, the data set 14 indicates that with regard to a category C3, which in the present example represents an issue order, an aggregated quantity q5 of the product will have to be delivered at a time t5, regardless of the product's version, characteristics and storage location.

In the example, it is assumed that the time t1 is earlier than t2, which in turn is earlier than t5. Also, it is assumed that the sum of the quantities q1 and q2 is greater than the quantity q5, with q5 greater than q2.

The data sets 10, 12, 14 are the input data to the product availability check and may also be referred to as first data sets in the context of the present invention. Each of the data sets 10, 12, 14 constitutes, or is part of, a different ATP time series. While in the example considered, data for a single bucket only is illustrated in relation to each ATP time series, a person of ordinary skills in the art will appreciate that each ATP time series may, and typically will, contain data for a plurality of buckets so as to reflect a sequence or series of planning situations.

The parameters: category, sublocation, version and characteristics together form a key (hereinafter also referred to as a first key) that is included in each data set 10, 12, 14. This key uniquely identifies the corresponding ATP time series. The various parameters form the elements of the key. They specify product-related conditions. As for the data set 10, the key element "category" has the value "C1", the key element "sublocation" has the value "S", the key element "version" has the value "V", and the key element "characteristics" has the value "CK". Thus, (C1, S, V, CK) is the key of the ATP time series associated with the data set 10. Similarly, (C2, S, V, CK) is the key of the ATP time series associated with the data set 12. As for the data set 14, the key element "category" has the value "C3", and the remaining key elements "sublocation", "version" and "characteristics" all have the value "-" indicating that no particular sublocation, version and characteristics are required for the product. Consequently, (C3, -, -, -) is the key of the ATP time series associated with the data set 14.

In the context of the present invention, the key element "category" can be viewed as a primary key element, and the other key elements "sublocation", "version" and "characteristics" can be viewed as secondary key elements. It will be readily appreciated by one of ordinary skills in the art that the primary and secondary key elements are not limited to those described above and may include any number and type of parameters.

According to the known method of performing product availability checks, the input ATP time series data is exploded with respect to the secondary key elements sublocation, version and characteristics. The exploded data is stored in a linear array, the exploded bucket array. Bucket arrays are created separately for issues, receipts and stock. Thus, three bucket arrays may be created, one for receipt orders, one for issue orders, and one for stock. In the middle portion of FIG. 4, an exemplary exploded bucket array 16 is depicted that has been created from the receipt order data sets 10 and 12. The array 16 includes a plurality of array fields. An index I is assigned to each array field of the array 16. Through the indices I, the array fields of the array 16 and their content can be accessed. Below the bucket array 16, another bucket array 18 is indicated that has been created from the issue order data set 14. In the example considered, the bucket array 18 includes a single array field, which can be likewise accessed through an index J.

The data explosion involves generating, for each input data set, an intermediate data set for each selection of any number of secondary key elements of the respective input data set. The intermediate data sets include the same category, quantity and time as the input data set from which they are generated. For example, the data set 10 having (S, V, CK) as its secondary key elements can be exploded into eight intermediate data sets. A first intermediate data set of the input data set 10 can be generated to include none of the secondary key elements of the input data set 10, i.e., (-, -, -, t1, C1, q1). A second intermediate data set of the input data set 10 can be generated to include one of the secondary key elements of the input data set 10, e.g., the secondary key element S, resulting in the intermediate data set (S, -, -, t1, C1, q1). A third intermediate data set of the input data set 10 can be generated to include another one of the secondary key elements of the input data set 10, e.g., the secondary key element V, yielding (-, V, -, t1, C1, q1) as the corresponding intermediate data set. Similarly, a fourth intermediate data set of the input data set 10 can be generated as (-, -, CK, t1, C1, q1). Further intermediate data sets of the input data set 10 can be generated to include a combination of two of the secondary key elements, i.e., V and CK, S and CK, and S and V. A last intermediate data set can be generated to include all of the secondary key elements of the input data set 10, i.e., S, V and CK. One will easily appreciate that such last intermediate data set corresponds to the input data set 10 itself.

Thus, the secondary key elements sublocation, version and characteristics of the input data sets define a certain level, and the explosion process can be viewed as involving the generation of intermediate data sets for the same and all higher (more coarse) levels.

As can be easily seen, the data set 12 can likewise be exploded into eight intermediate data sets. The sixteen intermediate data sets that can be generated in the above fashion from the data sets 10, 12 are stored in respective array fields in the bucket array 16. As stated earlier, the array fields of the bucket array 16 are assigned an index I to enable to individually access them.

As for the data set 14, this data set can be mapped onto a single intermediate data set only. The secondary key elements of this input data set define the uppermost level, i.e., the level of the plant itself with no consideration of the parameters sublocation, version and characteristics. As the data set 14 specifies an issue, it is exploded into a bucket array different from the bucket array 16, which is reserved for receipt orders.

In the example depicted in FIG. 4, the bucket array 18 receives the single intermediate data set that can be generated from the data set 14. Of course, depending on the content and number of issue orders, the exploded bucket array 18 may require a plurality of array fields to receive the exploded information. Similarly to the bucket array 16, each array field of the bucket array 18 is assigned an index J to allow access to its content.

In a subsequent step of the known method of performing product availability checks, the content of the exploded bucket arrays 16, 18 is used to generate what is referred to herein as ATP stacks. These are data structures that are created and temporarily stored for the purpose of the product availability check. In the ATP stacks, the information from the exploded bucket arrays is aggregated with respect to the categories. Separate ATP stacks are created for different levels. Each ATP stack is filled on the basis of the intermediate data sets in the arrays that belong to the same level as the respective stack. Intermediate data sets that represent issues are subtracted from intermediate data sets that represent stock or receipts. In this manner, the time-dependent free amount of the product or material at a particular level is obtained independent of the category.

On the right-hand side of FIG. 4, eight exemplary ATP stacks 20, 22, 24, 26, 28, 30, 32, 34 are depicted that have been created on the basis of the content of the exploded bucket arrays 16, 18. The ATP stacks 20-34 include a key that consists of the secondary key elements, and further include quantity information in relation to a series of time buckets. For example, the key of the ATP stack 20 is (-, -, -) indicating that this stack is for the uppermost level. In other words, the ATP stack 20 provides time-dependent information on the free amount of the product regardless of its sublocation, version and characteristics. The key of the ATP stack 34, on the other hand, is (S, V, CK) indicating that the stack is for the lowermost level. To put it in different terms, the ATP stack 34 provides time-dependent information on the free amount of the product having version V and characteristics CK in sublocation S. The ATP stacks 22-32 provide similar information for intermediate levels.

The principles of aggregating exploded ATP time series data to fill ATP stacks are well-known to a person versed in the art and need not be described in detail herein. To give one example, filling the ATP stack 20 in FIG. 4 requires aggregating the intermediate data sets indexed 1 and 2 of the bucket array 16 and the intermediate data set indexed 1 of the bucket array 18. The intermediate data set indexed 1 of the bucket array 16 indicates that the quantity q1 is received at time t1, and the intermediate data set indexed 2 of the bucket array 16 indicates that the quantity q2 will be received at time t2. However, the intermediate data set indexed 1 of the bucket array 18 indicates that the quantity q5 will have to be delivered at time t5. Thus, the free (available) amount at time t1 is calculated as q1+q2−q5=q6. At time t2, the aggregated quantity at the highest (plant) level is zero.

The ATP stacks are also referred to herein as second data sets.

In the known method of performing product availability checks, indices to array fields of receipt and stock bucket arrays are kept and stored in the ATP stacks. In the example of FIG. 4, since no input data related to stock is provided and consequently no exploded bucket array for stock is created, only the index I to the receipt bucket array 16 is kept in the ATP stacks 20-34. The indices in the ATP stacks allow to disaggregate the information in the ATP stacks to recover category-dependent information. Through the inclusion of the indices, which can be viewed as pointers to the array fields of the exploded bucket array(s), information about the categories is preserved in the ATP stacks.

With the conventional method of performing product availability checks, the following problem may be encountered. In many industries, products are manufactured and sold in many different versions, sizes, colors, shapes, etc. For example, a steel producing company may manufacture rolls of band steel in a number of different lengths. The length of the roll represents a characteristic of the product. Therefore, ATP time series data have to be generated and maintained for each length. More generally, if large numbers of product characteristics and/or many product versions and/or many sublocations are involved in the product availability check, the aggregation in the ATP time series is small, resulting in a large number of input data sets to the product availability check.

An exploded bucket array has to be a data structure with direct access via an index. Typically, the exploded bucket array is sorted primarily by the secondary key elements, i.e., sublocation, version and characteristics. Building up the exploded bucket array then frequently involves the addition of new array fields in intermediate portions of the array. To keep the index consistent, the array has to be copied every time a new entry is added. The permanent copying and resizing of the array during its build-up from the input data sets results in a N*N runtime behaviour (N being the number of input data sets involved in the check). The growing direct-access array therefore requires considerable computing capacity and time. If the number of input data sets increases, the runtime may exceed beyond acceptable levels. This makes the conventional method of performing product availability checks unattractive for cases where large amounts of characteristics and/or many versions and/or many sublocations occur.

Accordingly, there is a need for systems, methods, and articles of manufacture that reduce the computing capacity and time required for performing electronic product availability checks.

SUMMARY

According to one aspect of the present invention, a computer-implemented method of checking the availability of products is provided. The method includes receiving information on a plurality of first electronic data sets, each first data set including a first key and further including a product quantity in relation to a single point of time or time period, the first key including a primary key element and a plurality of secondary key elements, the primary and secondary key elements representative of product-related conditions; deriving, based on the information on the first data sets, information on one or more second electronic data sets, each second data set including a second key and further including product quantities in relation to a series of points of time or time periods, the second key exclusively formed of the secondary key elements; and checking the information on the one or more second electronic data sets against one or more product-related checking requirements to derive result information on the availability of one or more products.

The method further comprises the step of generating the information on the one or more second data sets directly based on the information on the first data sets. As used herein, directly means in particular that no direct-access data container (as an array) allowing indexed access to its content is generated from the input first data sets (i.e., the ATP time series data) before generating the information on the second data sets (i.e., the ATP stacks). It has been found that the second data sets can be filled directly from the information contained in the first data sets using the same principles of aggregation as used in the conventional method for filling the ATP stacks from the exploded bucket array. It has also been found that for the purpose of checking the sheer availability of a product, category information need not be preserved in the second data sets. Therefore, the second data sets can be generated so as to be free of linear array indices pointing to elements of a direct-access data container. Thus, the second data sets can be generated to be entirely free of category-related information.

In a case where plural sublocations and/or versions and/or characteristics are involved in the product availability check, only a part of the resulting ATP stacks may be relevant for a particular checking requirement. For example, if the availability of a product having particular characteristics is to be checked, ATP stacks related to other characteristics are irrelevant. Then, by examining the checking requirements early on, information can be gathered which ATP stacks are relevant for each respective checking requirement. In a preferred embodiment of the present invention, such information is added to each checking requirement, and at the time of evaluation of the ATP stacks, only ATP stacks indicated as relevant in a checking requirement are checked against that checking requirement.

The present invention further provides a computer program product comprising program code means adapted to cause a computer executing the program code means to carry out the steps of the method of the present invention. The computer program product may be provided in the form of a computer-readable information carrier medium, for example an optical or magnetic disk.

Moreover, the present invention provides a computer system for checking the availability of products, the system comprising processing means configured to receive information on a plurality of first electronic data sets, each first data set including a first key and further including a product quantity in relation to a single point of time or time period, the first key including a primary key element and a plurality of secondary key elements, the primary and secondary key elements representative of product-related conditions; derive, based on the information on the first data sets, information on one or more second electronic data sets, each second data set including a second key and further including product quantities in relation to a series of points of time or time periods, the second key exclusively formed of the secondary key elements; and check the information on the one or more second electronic data sets against one or more product-related checking requirements to derive result information on the availability of one or more products.

According to the present invention, the processing means are configured to generate the information on the one or more second data sets directly based on the information on the first data sets.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described herein.

BRIEF DESCRIPTION OF THE DRAWINGS

The accompanying drawings are incorporated in and constitute a part of this specification and, together with the description, explain the principles of the invention. In the drawings.

DETAILED DESCRIPTION

Reference will now be made in detail to the exemplary embodiments of the invention. Wherever possible, the same reference numbers will be used throughout the drawings to refer to the same or like parts.

Figure 1:
FIGS. 1 and 2 schematically illustrate stages of a procedure for checking the availability of products according to an embodiment of the present invention.
Figure 4:
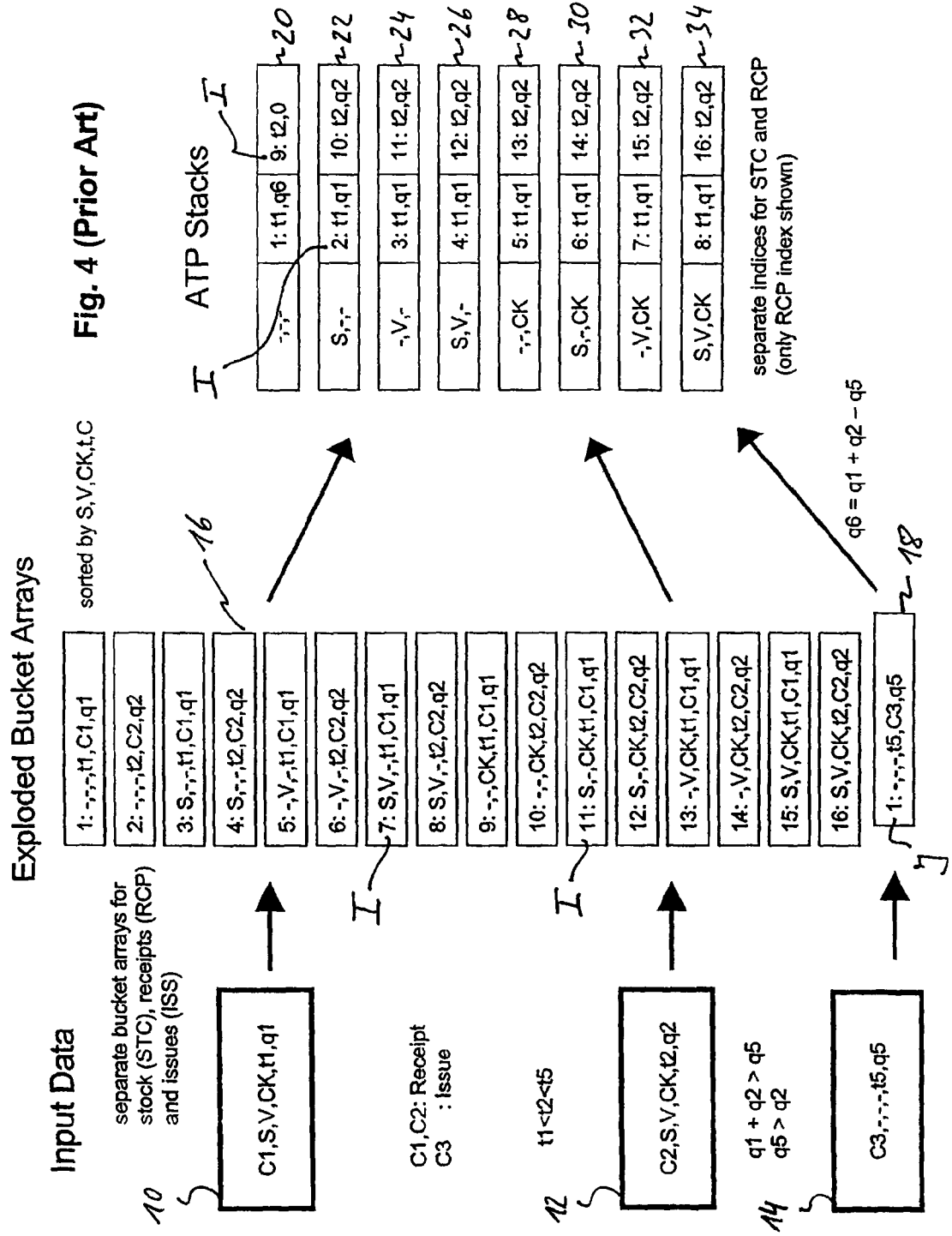
FIG. 4 schematically illustrates stages of a conventional procedure for performing product availability checks.

On the left-hand side of FIG. 1, the same data sets 10, 12, 14 (first data sets) as in FIG. 4 are schematically depicted. Again, the data sets 10, 12, 14 are used as exemplary input to the product availability check.

On the right-hand side of FIG. 1, ATP stacks 36, 38, 40, 42, 44, 46, 48, 50 (second data sets) are shown. These stacks correspond to the stacks 20-34 of FIG. 4 except that the stacks 36-50 include no indices I. The time-dependent quantity information contained in the stacks 36-50 is the same as in FIG. 4, as can be easily verified from a comparison of both figures. According to the preferred embodiment, the stacks 36-50 are filled directly from the input data sets 10, 12, 14. Build-up of intermediary exploded bucket arrays is avoided. The explosion of the data sets 10, 12, 14 with respect to the secondary key elements sublocation, version and characteristics is done while the stacks are filled. The same principles of exploding the input data sets and aggregating the exploded data as employed in the conventional method are utilized when filling the stacks 36-50 from the information contained in the data sets 10, 12, 14.

For example, for filling the stack 36 (which represents the plant level without consideration of the sublocation, version and characteristics), the quantity information of all three data sets 10, 12, 14 is aggregated, resulting in the available quantity q6 at time t1 and the available quantity 0 at time t2. Further, for filling the stack 38 (and all other stacks 40-50), only the quantity information of the data sets 10, 12 is aggregated. The data set 14 is irrelevant to filling stacks of levels other than the plant level as it requires the issue of the quantity q5 regardless of the sublocation, version and characteristics of the product to be issued.

In this way, all stacks 36-50 can be filled without resorting to an intermediary data container for storing the exploded input data in indexed form. This allows to generate the ATP stacks in less time and with less computing capacity and makes the method for performing product availability checks according to the present invention attractive and feasible also for cases where a large number of characteristics has to be dealt with. The save in computing resources as provided for by the present invention allows to conveniently utilize such resources for other purposes.

Figure 2:
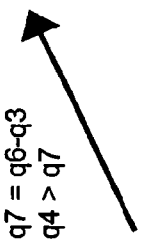
Figure 2:
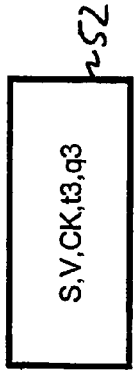
Figure 2:

FIG. 2 exemplarily illustrates the calculation of results from the ATP stacks 36-50. Specifically, the task in FIG. 2 is to calculate results for two checking requirements designated 52, 54, which are given as (S, V, CK, t3, q3) and (S, V, CK, t4, q4), respectively, where t3 is a point of time or time period between times t1 and t2 and t4 is a point of time or time period later than t2. The checking requirements 52, 54 ask for the delivery of quantities q3 and q4 of version V and characteristics CK from sublocation S at the times t3 and t4, respectively. They are input by a user through some form of user interface into a computer system which carries out the product availability check.

In the calculation process, each of the ATP stacks 36-50 is checked for the availability of the quantities q3, q4 at the requested times. The particular manner of calculating the results from the ATP stacks is well-known to those skilled in the art and need not be described in detail herein. The result table depicted in FIG. 2 shows calculated partial results for each level. The overall (total) result is the minimum of the partial results on the various levels, which in the illustrated example is the partial result for the plant level. The total result thus obtained reveals that the quantity q3 is available at the requested time t3. Consequently, the requirement 52 can be confirmed completely. The quantity q4, however, is not available at the requested time t4. Only a partial quantity q7 can be delivered. Thus, the requirement 54 can be confirmed only partially.

Advantageously, the ATP stacks are stored in a tree-like manner in a container, allowing fast insertion and search. The runtime of the product availability check can then exhibit a logarithmic behaviour, which is faster and consumes less computing resources than the quadratic runtime behaviour of the conventional method.

Figure 3:
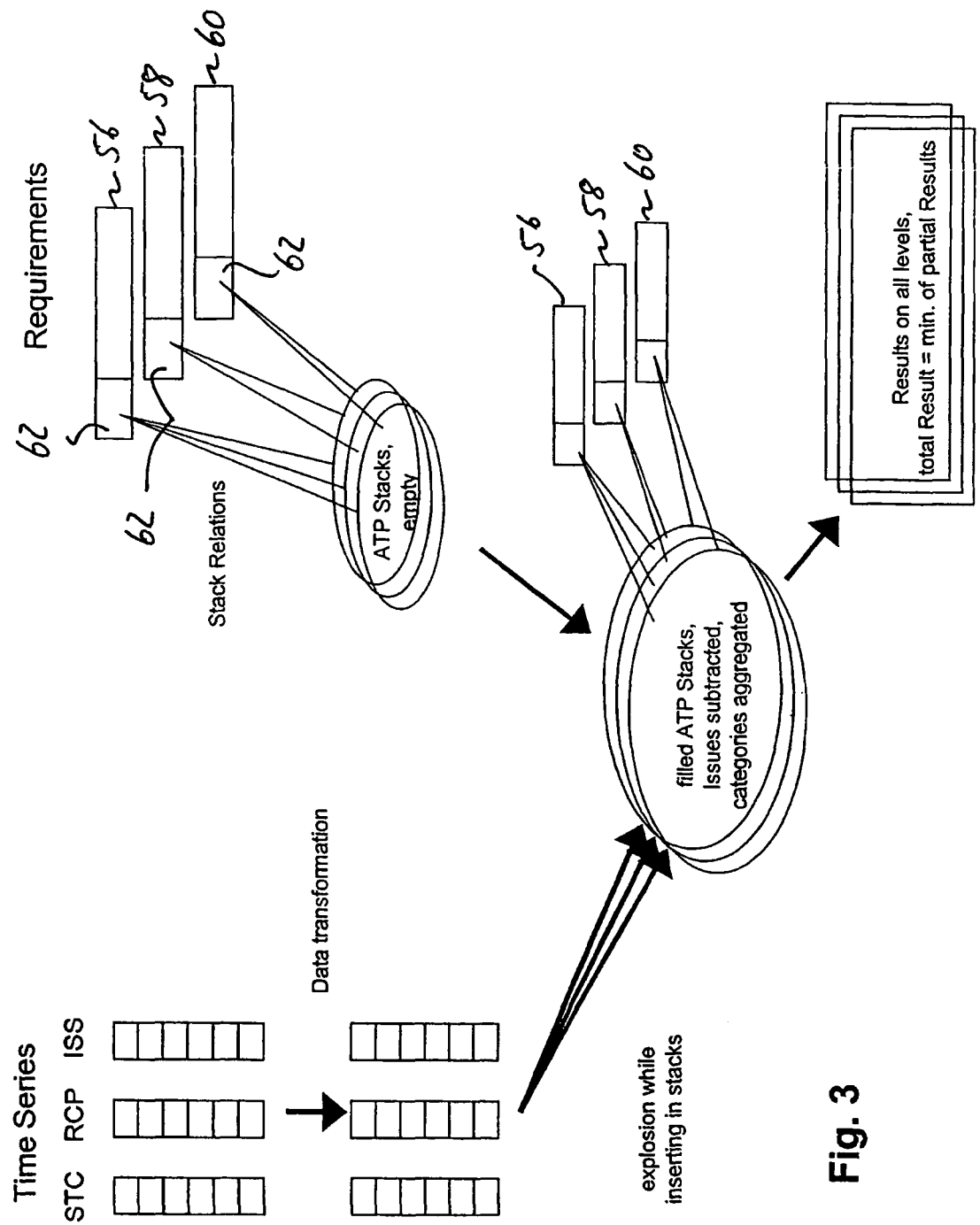
FIG. 3 depicts a schematic overview of a product availability checking procedure according to the present invention.

The schematic overview of FIG. 3 shows checking requirements 56, 58, 60 for which a product availability check is to be performed. Based on the checking requirements 56-60, a plurality of ATP stacks are provided, which are initially empty. As can be easily appreciated, each checking requirement may require only some of the ATP stacks to perform the product availability check. Therefore, in the preferred embodiment of the present invention, information on relevant ATP stacks is inserted in each checking requirement when establishing the (empty) ATP stacks. The added information is placed in a portion 62 of each checking requirement. It represents pointers to ATP stacks.

Then, after the ATP stacks have been filled based on input ATP time series data, the calculation of results is facilitated owing to the relations between the checking requirements and the ATP stacks as stored in the portions 62 of the checking requirements. These relations make repeated searches on the entire container of ATP stacks obsolete. The stored relations allow to select only relevant ATP stacks, thus accelerating the result calculation process.

Although not shown in the figures, when generating the ATP stacks, not only the ATP time series data, but also additional data such as correction data may have to be taken into account. Such correction data may, e.g., account for unanticipated delivery delays that are not reflected in the ATP time series data, but require consideration at the time of performing a product availability check. As with the ATP time series data, the additional data flows in no intermediary array before being applied to the ATP stacks.

FIG. 3 further indicates that a transformation step may be carried out on the ATP time series data prior to its explosion and insertion into the ATP stacks. Such transformation consists in shifting the scheduled reception time of certain or all receipts. Typically, a conservative approach is taken where receipts are treated as being available only at the end of the time bucket in which they fall (e.g., at the end of the day if one day is used as the measure for a time bucket). In this way, confirmation of a requirement can be avoided in a situation where an expected receipt is late for some reason. Occasionally, however, a prospective approach is taken wherein all receipts are considered available already at the beginning of the time bucket in which they fall (for example, if it can be guaranteed that the receipts will all be on time). To this end, the receipts are shifted toward the past by one time bucket. Also, there may be a situation where a receipt that was due in the past is delayed because of a strike, for example. Transformation allows to shift this receipt to a certain day in the future if it is known that the goods will have been received by that day (e.g., because the strike is over). In this way, the anticipated receipt can be included in the product availability check.

The present invention can be implemented on any localized or distributed computer system having suitable processing means to perform the various calculations involved in the methodology of the present invention. In particular, the computer system may be configured as a computer network system having computing and/or storage resources that are shared, and can be accessed, by a number of user computers. For example, the ATP time series data may reside in a central database or cache of the network system.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A computer-implemented method of checking the availability of products, the method comprising:
    receiving information, by a processor, on a plurality of first electronic data sets, each first data set including a first key and further including a product quantity in relation to a single point of time or time period, said first key including a primary key element and a plurality of secondary key elements, said primary and secondary key elements representative of product-related conditions;
    deriving, by the processor, information on one or more second electronic data sets, each second data set including a second key and further including product quantities in relation to a series of points of time or time periods, said second key exclusively formed of said secondary key elements;
    receiving, by the processor, a query including a product quantity for one or more products; and
    checking, by the processor, said information on said one or more second electronic data sets against one or more product-related checking requirements to derive result information on whether the product quantity for the one or more products given in the query is available,
    wherein said information on said one or more second data sets is availability-to-promise stacks, the availability-to-promise stacks are filled based on exploding said information on said first data sets while the availability-to-promise stacks are filled, and no direct-access data container allowing indexed access to its content is generated from the first data set before filling the availability-to-promise stacks.

2. The method of claim 1, wherein said information on said one or more second data sets is established so as to be free of linear array indices.

3. The method of claim 1, wherein a plurality of checking requirements are received, information on one or more relevant second data sets is added to each checking requirement, and only relevant second electronic data sets are checked against each checking requirement.

4. The method of claim 1, wherein said primary key element specifies a category.

5. The method of claim 1, wherein one of said secondary key elements is representative of a product location.

6. The method of claim 1, wherein one of said secondary key elements is representative of a product version.

7. The method of claim 1, wherein at least one of said secondary key elements is representative of a product characteristic.

8. A computer program product for causing a computer to perform a method of checking the availability of products, the method comprising:
    receiving information on a plurality of first electronic data sets, each first data set including a first key and further including a product quantity in relation to a single point of time or time period, said first key including a primary key element and a plurality of secondary key elements, said primary and secondary key elements representative of product-related conditions;
    deriving, based on said information on said first data sets, information on one or more second electronic data sets, each second data set including a second key and further including product quantities in relation to a series of points of time or time periods, said second key exclusively formed of said secondary key elements;
    receiving a query including a product quantity for one or more products; and
    checking said information on said one or more second electronic data sets against one or more product-related checking requirements to derive result information on whether the product quantity for the one or more products given in the query is available,
    wherein said information on said one or more second data sets is availability-to-promise stacks, the availability-to-promise stacks are filled based on exploding said information on said first data sets while the availability-to-promise stacks are filled, and no direct-access data container allowing indexed access to its content is generated from the first data set before filling the availability-to-promise stacks.

9. The computer program product of claim 8 in the form of a computer-readable information carrier medium.

10. A computer system for checking the availability of products, the system comprising processing means configured to:
    receive information on a plurality of first electronic data sets, each first data set including a first key and further including a product quantity in relation to a single point of time or time period, said first key including a primary key element and a plurality of secondary key elements, said primary and secondary key elements representative of product-related conditions;
    derive, based on said information on said first data sets, information on one or more second electronic data sets, each second data set including a second key and further including product quantities in relation to a series of points of time or time periods, said second key exclusively formed of said secondary key elements;
    receive a query including a product quantity for one or more products; and
    check said information on said one or more second electronic data sets against one or more product-related checking requirements to derive result information on whether the product quantity for the one or more products given in the query is available,
    wherein said one or more second data sets are availability-to-promise stacks, said processing means are configured to fill said information on said availability-to-promise stacks based on exploding said information on said first data sets while filling said availability-to-promise stacks, and no direct-access data container allowing indexed access to its content is generated from the first data set before filling the availability-to-promise stacks.

* * * * *